United States Patent [19]
Danek, Michael J.

[11] 3,750,780
[45] Aug. 7, 1973

[54] BRAKE OPERATED THROTTLE OVERRIDE DEVICE

[75] Inventor: Michael J. Danek, Laingsburg, N.J.

[73] Assignee: General Motors Corporation, Detroit, Mich.

[22] Filed: Jan. 21, 1972

[21] Appl. No.: 219,680

[52] U.S. Cl. ............... 192/3 R, 123/198 D, 285/58
[51] Int. Cl. ........................................... B60k 29/00
[58] Field of Search .......................... 192/3 R, 3 T

[56] References Cited
UNITED STATES PATENTS

| | | | |
|---|---|---|---|
| 1,897,357 | 2/1933 | Bellis | 192/3 R X |
| 2,152,098 | 3/1939 | Sanford | 192/3 R X |
| 2,372,842 | 4/1945 | Mossinghoff | 192/3 R X |
| 2,402,851 | 6/1946 | Sobie | 192/3 R X |
| 2,604,962 | 7/1952 | Tibbetts | 192/3 R |
| 2,876,877 | 3/1959 | Selyem | 192/3 R |
| 3,331,477 | 7/1967 | Trifiletti et al. | 192/3 T |

Primary Examiner—Benjamin W. Wyche
Attorney—E. W. Christen et al.

[57] ABSTRACT

A throttle override cable, a beaded chain, and a cable length self-adjusting device are connected in series between the vehicle brake pedal and a first throttle lever that is fixed to a throttle shaft carrying a throttle valve. The first lever is coupled by a spring to normally move conjointly with a second throttle lever that is connected to the vehicle throttle pedal to normally transmit throttle pedal motion to the throttle valve. The first throttle lever is pivotable relative to the second throttle lever so that, with the second lever restrained from movement in a throttle closing direction, the brake pedal may pivot the first lever in that direction after overcoming the bias of the coupling spring. The beaded chain provides sufficient slack to permit normal control of the throttle valve by the vehicle throttle pedal with the brake pedal released and the cable length adjuster adjusts the effective length of the override cable to prevent attempted movement of the throttle valve past its idle position.

2 Claims, 3 Drawing Figures

PATENTED AUG 7 1973 3,750,780

BRAKE OPERATED THROTTLE OVERRIDE DEVICE

This invention relates to a brake operated throttle override device for overriding the throttle pedal linkage normally controlling the throttle of an internal combustion engine and more particularly to a throttle override device for returning the throttle to an idle position when the trottle pedal linkage is not normally able to do so.

The present invention provides a throttle override linkage that returns the throttle valve of an internal combustion engine carburetor to its idle position when the throttle pedal linkage for normally controlling the position of a throttle valve is restrained from moving the throttle valve in a closing direction. A throttle override cable, a cable length self-adjusting device, and a beaded chain are connected in series between the vehicle brake pedal and a first throttle lever that is fixed to pivot a throttle shaft carrying a throttle valve. A helical spring couples the first lever to normally move conjointly with a second throttle lever that is connected by a throttle cable to the vehicle throttle pedal to normally transmit throttle pedal motion to the throttle valve. The first throttle lever is pivotable relative to the second lever so that, with the second lever restrained from movement in a direction to close the throttle valve, the brake can pivot the first lever in that direction after overcoming the bias of the coupling spring. A return spring is connected to the first lever to normally return the throttle valve to an idle position upon release of the throttle pedal, the return spring having a return bias less than the coupling bias of the coupling spring so that the levers do not uncouple when the throttle pedal is depressed. Full depression of the brake pedal after initial connection of the override linkage or after increased brake pedal travel with use causes the cable length self-adjusting device to slip on the brake cable to increase effective length of the cable so as to prevent attempted movement of the throttle valve past its idle position. The slack provided by the beaded chain is sufficient to permit the throttle pedal linkage to normally control the position of the throttle valve between an idle and a full open position independently of the brake pedal when released. Should the second lever for some reason be restrained from normal conjoint movement in the throttle closing direction with the first lever, brake pedal depression first takes up slack in the beaded chain and then, after overcoming the bias of the coupling spring aided by the bias of the return spring, pivots the first lever to close the throttle valve.

It is an object of the present invention to provide a throttle override linkage for returning the trottle valve of a combustion engine carburetor to its idle position when the throttle pedal linkage for normally controlling the position of the throttle is restrained from moving in a direction to close the throttle valve.

It is another object of the present invention to provide a throttle override linkage of the foregoing type, wherein the override linkage is operated by the vehicle brake pedal and includes a first throttle lever for rotating the shaft carrying the throttle valve and a second throttle lever for normally transmitting the motion of a vehicle throttle pedal to the throttle valve, the first lever being normally coupled to the second lever by a helical spring that causes the two levers to normally move conjointly and allows the brake pedal to pivot the first lever in a throttle valve closing direction whenever the motion of the second lever is restrained in that direction.

It is a further object of the present invention to provide, in a throttle override linkage of the foregoing type, a return spring connected to the first lever for normally returning the throttle valve to its idle position upon throttle pedal release, the return spring applying a return bias on the first lever less than the coupling bias of the coupling spring so that the levers are not uncoupled by the throttle pedal, such return bias also aiding the operation of the override linkage.

It is a further object of the present invention to provide a throttle override linkage for returning the throttle valve of an internal combustion engine carburetor to its idle position when the movement of the throttle pedal linkage for normally controlling the throttle valve is restrained wherein a cable length adjusting device and a lost motion section connect a brake-operated cable in series between the vehicle brake pedal and a first throttle lever fixed to rotate with a throttle shaft and wherein a second throttle-pedal-operated throttle lever is coupled by a coupling spring to normally move conjointly with the first lever, the lost motion section permitting the throttle pedal to normally move the throttle valve between its idle and full open positions and the cable self-adjusting device increasing the effective length of the brake cable to prevent the throttle valve from being pivoted past its idle position by the brake pedal.

These and other objects and features of the present invention will become more apparent with reference to the following description taken in conjunction with the accompanying drawings, wherein.

Figure 1:
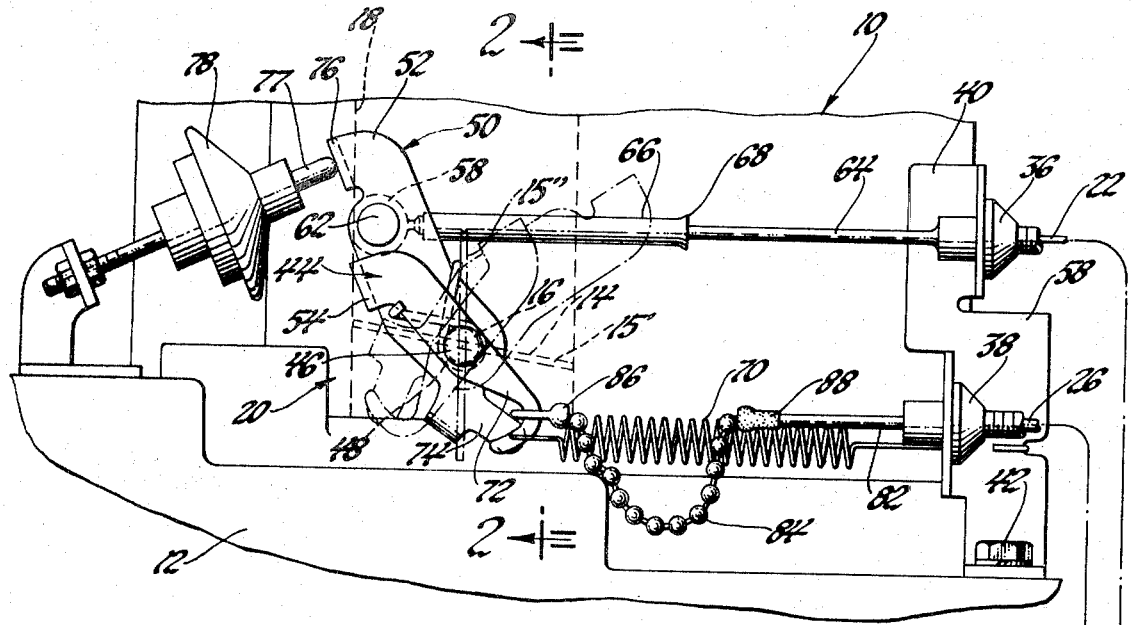
FIG. 1 is a view partly in elevation and partly in schematic of an internal combustion engine carburetor throttle control provided in accordance with the present invention and including a cable length self-adjusting device.
Figure 1:
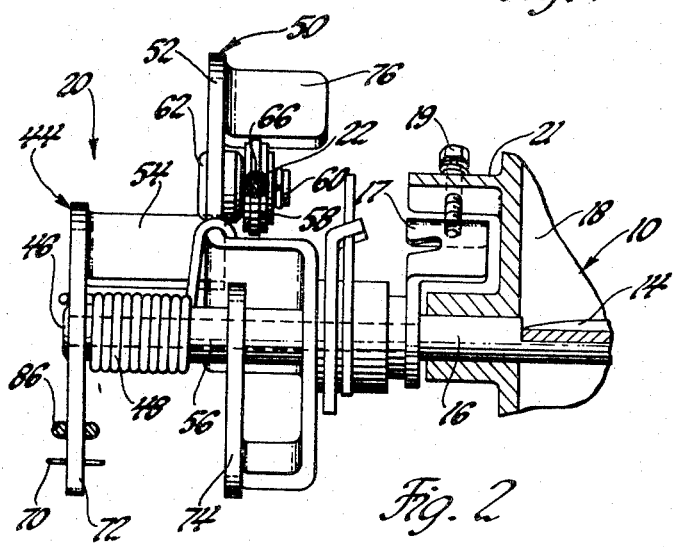
Figure 2:
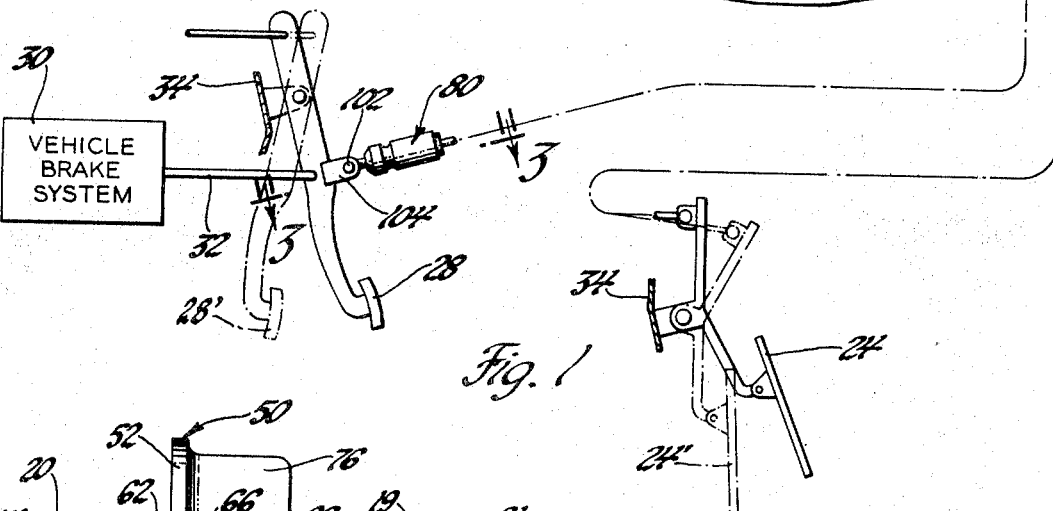
FIG. 2 shows the throttle control of FIG. 1 taken along view 2—2 of FIG. 1.

With reference now to FIG. 1, there is shown a carburetor 10 for providing air-fuel flow to an internal combustion engine 12 under the control of the throttle valve 14 pivotable by a throttle shaft 16 in a throttle bore 18. Throttle valve 14 is normally pivoted between an idle position 15' and a full open throttle position 15" by a throttle pedal linkage 20 that includes a throttle cable 22, one end of which is connected as described below to normally pivot throttle shaft 16 and the other end of which is connected to be retracted rightwardly by the depression of a throttle pedal 24 to pivot throttle valve 14 clockwise in a valve opening direction. To allow throttle valve 14 to be returned to its idle position when the normal operation of the throttle pedal linkage is restrained, a brake pedal operated throttle override linkage is provided to pivot throttle valve 14 in a valve closing direction. This override linkage includes a brake cable 26 one end of which is connected as described below to pivot throttle shaft 16 and the other end of which is connected to be retracted by the depression of a vehicle brake pedal 28 which normally operates a vehicle brake system 30 through the depression of a connecting rod 32. Both throttle pedal 24 and brake pedal 28 are pivotably supported from an engine firewall 34, and cable 22 and cable 26 are slippingly supported relative to engine 12 by respective grommets 36 and 38 secured to a cable bracket 40 mounted to engine 12 by bolts 42.

Throttle valve 14 is moved between its idle and wide open throttle position by a first or fixed lever 44 fixed to throttle shaft 16 by a rivet 46. Fixed lever 44 is connected as described below to brake cable 26 and is coupled by helical spring 48 to normally follow the motion of a second or loose throttle lever 50 that is pivotable relative to fixed lever 44 and that has a radial arm 52 connected to the throttle end of throttle cable 22. Spring 48 couples loose lever 50 against a tab 54 extending axially from fixed lever 44 and is seated on a spacer sleeve 56 passing over shaft 16 and axially separating lever 44 from lever 50 thereon. Spring 48 couples loose lever 50 to normally pivot conjointly with fixed lever 44 and with shaft 16 as long as the movement of loose lever 50 is not restrained. But, as further described below, whenever lever 50 is restrained from pivoting in the direction to return throttle valve 14 to its idle position, brake pedal 28 if depressed pivots fixed lever 44 in the valve closing direction after overcoming the coupling effect of spring 48.

To pivot throttle valve 14 in the throttle opening direction, the throttle end of throttle cable 22 is connected to radial arm 52 of loose lever 50 by an eyelet 58 pivotable on a pin 60 connected to arm 52 by a rivet 62. To protect the length of throttle cable 22 between cable bracket 40 and eyelet 58 from foreign matter surrounding engine 12, cable 22 extends both through a tubular snout 64 connected to cable bracket 40 and pointing towards fixed throttle lever 44 and through a sleeve 66. One end of sleeve 66 is connected to eyelet 58 and the other end has a bell-mouthed opening 68 to permit sleeve 66 to slide freely over snout 64 as throttle pedal 24 is moved between a released position shown solid and a fully depressed depression position 24' shown dotted.

A throttle return spring 70 is connected between cable bracket 40 and a hooked arm portion 72 of fixed lever 44 extending radially from shaft 16 opposite tab 54. Upon release of throttle pedal 24, spring 70 normally rotates fixed lever 44 in the throttle closing direction until movement is stopped by the abutment of a slow idle stop 17 fixed to rotate with shaft 16 against the end of a slow idle adjustment screw 19 threaded through a boss 21 on carburetor 10. Due to normal conjoint movement of fixed and loose levers 44 and 50, return spring 70 not only normally returns throttle valve 14 to its idle position upon throttle pedal release but also returns throttle pedal 24 to its released condition by the leftward extension of throttle cable 22 relative to bracket 40 associated with the counterclockwise movement of loose lever 50.

The effect of the bias of return spring 70 on fixed lever 44 is selected to be less than the effect of spring 48 coupling levers 44 and 50, thereby permitting these levers to move conjointly with the depression of throttle pedal 24 rather than being uncoupled by throttle pedal depression as might otherwise be the case should the bias of return spring 70 be greater than that coupling spring 48. In an alternate embodiment, the return spring is connected to loose lever 48 at a radial arm 74 radially opposite tab 54 rather than to fixed lever 44 as in FIG. 1. However, connection of spring 70 to fixed lever 44 is preferable since the bias of return spring 70 then reduces the pedal force required at brake pedal 26 to overcome the coupling force of coupling spring 48 so as to return throttle valve 14 to the idle position should the loose lever 50 be restrained from conjoint movement in the closing direction with fixed lever 44.

Loose lever 50 also has an axially extending tab 76 that overlaps a plunger 77 of a dashpot 78 secured to engine 12. The closure rate of throttle valve 14 normally effected by return spring 70 upon release of throttle pedal 24 is retarded as tab 76 engages and depresses plunger 77, such retardation of throttle valve closure avoiding rich fuel mixtures and possible incomplete combustion thereof that might otherwise result from fast throttle valve closure.

One end of brake cable 26 is connected to brake pedal 28 by a cable length self-adjuster 80 and the other end is connected to a rigid rod 82 slidable in cable grommet 38 and pointing toward hooked arm 72 of fixed lever 44. Connected between fixed lever 44 and rod 82 is a slack-providing beaded chain 84, one end of which is clipped to hook arm 72 by a clip 86 and the other end of which is connected to rod 82 by a plastic sleeve 88. The slack provided by beaded chain 84 is sufficient to allow the throttle pedal linkage to effect full movement of fixed lever 44 for normally moving throttle valve 14 between its idle and wide open positions as long as brake pedal 26 is released. The length of this slack is equal to the linear travel of clip 86 as throttle valve 14 is moved between its idle and wide open positions, this slack also equalling the length of travel of cable length adjuster 80 as brake pedal 28 moves between its released position shown solid and its fully depressed condition 28' shown dotted.

Figure 3:
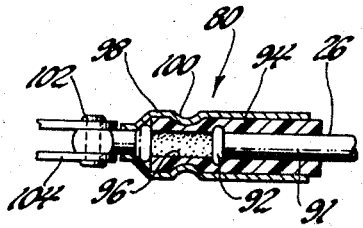
FIG. 3 is a cross-sectional view of the self-length adjustment device of FIG. 1 taken along view 3—3.

Cable length self-adjusting device 80 increases the effective length of brake cable 26 so as to prevent attempted movement of throttle valve 14 past its idle position in a valve closing direction upon full depression of brake pedal 28 and may be of the type described in my copending patent application Ser. No. 176,477, entitled "Cable Length Adjuster," filed Aug. 31, 1971, and assigned to the assignee of the present invention. Briefly, as shown in greater detail in FIG. 3, one end portion 91 of brake cable 26 and an enlarged diameter beaded portion 92 thereon are grasped in a polyurethane sleeve 94 having a central bore 96 therethrough of inner diameter less than the outer diameter of bead portion 92. Sleeve 94 is positioned and secured in a sheet metal tube 98 by a crimped neck 100 therein, tube 98 being pivotably connected by a pin 102 to a bracket 104 secured to brake pedal 28. Upon initial assembly of beaded chain 84, brake cable 26, and cable length adjuster 80 between hooked arm 72 of fixed lever 44 and bracket 104 of brake pedal 28, beaded portion 92 of brake cable 26 is positioned to the left of sleeve bore 96 as shown by the dotted lines in FIG. 3. However, to accommodate the entry and movement of beaded portion 92 in bore 96 and then resume its original shape after bead 92 has passed, sleeve 94 is made of a suitable synthetic rubber or elastomeric plastic which is resilient, tough, stretchable and capable of returning to its original configuration after distortion within predetermined limits.

Such movement is effected upon the initial full depression of brake pedal 28 after beaded chain 84, brake cable 26, and adjuster 80 have been initially connected in series between fixed lever 44 and brake pedal 28. As the length of brake pedal travel increases with brake use, the effective length of brake cable 26 is further increased by subsequent full brake depressions. Upon the full depression of brake pedal 28 with throttle valve 14 in the idle position so that slow idle stop 17 is biased against screw 19 by return spring 70 through fixed lever 44 and shaft 16, brake cable 26 is retracted by sleeve 94 and tube 98 of adjuster 80 to first take up the slack in chain 84. As brake pedal 28 is depressed further after such slack takeup, sleeve 94 is forced over beaded portion 92 by tube 98 until bead 92 attains an intermediate position in bore 96, shown solid in FIG. 3, at which the idle position of throttle valve 14 is coordinated with the fully depressed condition of brake pedal 28. After the effective length of cable 26 is lengthened by the above process, cable end portion 91 and bead 92 cooperate with sleeve 94 to maintain the resultant overall adjusted length of brake cable 26 for the same lengths of travel of brake pedal 28. Moreover, so that subsequent brake depressions move fixed lever 44 rather than cause further adjustment of the effective length of cable 26, the force required to cause sleeve 94 to slip on bead 92 is selected to be greater than the force that cable 26 must apply to fixed lever 44 to uncouple helical spring 48.

Having described one embodiment of the present invention it is understood that the specific terms and examples are used in a descriptive sense and not for the purpose of limitation. Other embodiments of the invention, modifications thereof, and alternatives thereto may be used. I therefore aim in the appended claims to cover such modifications and changes as fall within the true spirit and scope of my invention.

What I claim as new and desire to secure by Letters Patent of the United States is:

1. A throttle control for controlling an internal combustion engine comprising:
   a. a carburetor having a throttle valve;
   b. a rotatable shaft connected to said throttle valve to pivot said throttle valve in a throttle opening direction towards a full open position and in a throttle closing direction towards an idle position;
   c. a fixed throttle lever connected to said throttle shaft and a loose throttle lever pivotable about said throttle shaft, said throttle levers having a conjoint movement condition wherein said loose lever is able to normally move conjointly with said fixed lever and a loose condition wherein said loose lever may be prevented from moving conjointly with said fixed lever, said levers having limit means engageable to limit the movement of said loose lever relative to said fixed lever in said throttle closing direction and disengageable to permit movement of one of said levers relative to the other;
   d. return spring means connected to said fixed lever for normally biasing said levers in said throttle closing direction to normally return said throttle valve to said idle position;
   e. coupling spring means for normally biasing said limit means in engagement against the bias of said return spring means to normally establish said conjoint movement condition;
   f. a vehicle brake system for effecting vehicle braking and including a brake pedal having a depressed condition wherein it is depressed by the operator of said throttle control and a released condition where it is not depressed; and
   g. mechanical linkage means including a cable and lost motion means connected between said vehicle brake pedal and said fixed throttle lever, said linkage means operative when said loose lever is prevented from moving conjointly with said fixed lever and said brake pedal in said depressed condition to pivot said throttle valve in said closing direction by overcoming the bias of said coupling spring means and disengaging said limit means to pivot said fixed lever in said valve closing direction with respect to said loose lever, said lost motion means operative with said brake pedal in said released condition to provide a slack sufficient to permit said throttle valve to be moved between said full open and idle positions by said fixed lever, said slack and said cable preventing movement of said throttle valve past said idle position by said brake.

2. A throttle control for controlling an internal combustion engine comprising:
   a. a carburetor having a throttle valve;
   b. a rotatable shaft connected to said throttle valve to pivot said throttle valve in a throttle opening direction towards a full open position and in a throttle closing direction towards an idle position;
   c. a fixed throttle lever connected to said throttle shaft and a loose throttle lever pivotable about said throttle shaft, said throttle levers having a conjoint movement condition in which said loose lever is able to normally move conjointly with said fixed lever and a loose condition wherein said loose lever may be restrained from moving conjointly with said fixed lever, said levers having limit means engageable to limit the movement of said loose lever relative to said fixed lever in said throttle closing direction and disengageable to permit movement of one of said levers relative to the other;
   d. return spring means for normally biasing one of said levers in said throttle closing direction to normally return said throttle valve to said idle position;
   e. coupling spring means for normally biasing said limit means in engagement to normally establish said conjoint movement condition;
   f. a throttle pedal linkage for normally pivoting said loose lever in said valve opening direction and including a throttle pedal having an operative condition wherein it is operated by the operator and having an inoperative condition where it is not operated by the operator, said throttle pedal operative when in said operative condition to pivot said levers in said throttle opening direction;
   g. a vehicle brake system for effecting vehicle braking by the operator of said throttle control and including a brake pedal having an operative condition wherein it is operated by the operator of said throttle control and an inoperative condition where it is not operated; and
   h. mechanical linkage means including cable means, lost motion means and linkage length adjustment means, said linkage means connected in series between said vehicle brake pedal and said fixed throttle lever and operative with said levers in said loose condition and with said throttle pedal in said inoperative condition and said brake pedal in said operative condition to pivot said throttle valve in said valve closing direction by overcoming the bias of said coupling spring means and disengaging said limit means to pivot said fixed lever in said valve closing direction with respect to said loose lever, said lost motion means operative with said throttle pedal in said operative condition and said brake pedal in said inoperative condition to permit said throttle valve to be moved between said full open and idle positions by said levers in said conjoint movement condition, and said linkage length adjustment means operative upon initial operation of said brake pedal after said linkage means have been connected to increase the length of said mechanical linkage means to prevent said throttle valve from being moved past its idle position by said brake pedal.

* * * * *